J. Naylor,
Steam Trap.
N° 53,031.    Patented Mar. 6, 1866.
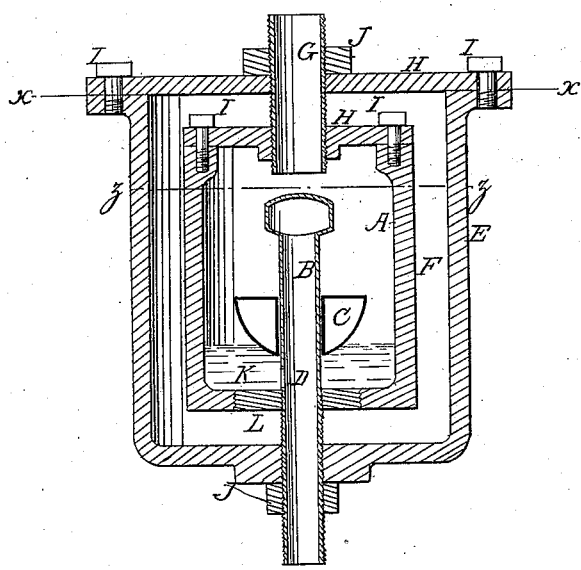
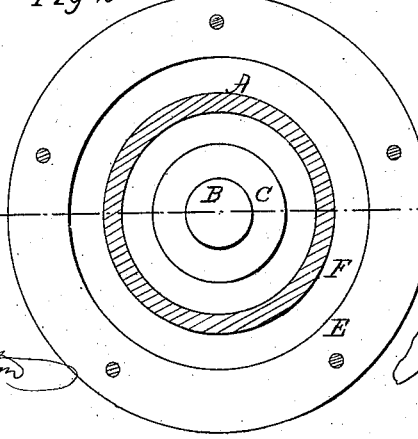

UNITED STATES PATENT OFFICE.

JAMES NAYLOR, OF PROVIDENCE, RHODE ISLAND.

IMPROVEMENT IN STEAM-TRAPS.

Specification forming part of Letters Patent No. 53,031, dated March 6, 1866.

*To all whom it may concern:*

Be it known that I, JAMES NAYLOR, of Providence, in the county of Providence and State of Rhode Island, have invented a new and useful Improvement in Steam-Traps; and I do hereby declare that the following is a full, clear, and exact description thereof, which will enable others skilled in the art to make and use the same, reference being had to the accompanying drawings, forming part of this specification, in which—

Figure 1 is an elevation of a vertical section of a steam-trap made according to my invention, the plane of section being seen at $y$, Fig. 2. Fig. 2 is a cross-section on the lines $x$ and $z$, Fig. 1.

Similar letters of reference indicate like parts.

The object of this invention is to improve the steam-trap both in efficiency and simplicity of operation and construction.

A is a vessel of cylindrical form, through whose bottom is screwed a pipe, B, of brass or other metal not easily corroded. The top of this pipe is closed, being in this example enlarged to form a hollow nut, which is seized by the hand when the tube B is to be screwed down into its place. The pipe B is to be turned true and smooth. C is a hollow sheet-brass float, the center of which is a brass pipe bored out so as to slide easily on the pipe B. D is a small hole cut in the pipe B immediately above the bottom of the vessel A. The bottom L of the vessel A has a circular piece of brass screwed into it for the purpose of presenting a less oxidizable surface than iron to the contact of the float.

If desired, the whole of the bottom or the whole of the vessel may be of brass or other metal not easily oxidized.

The vessel A is placed centrally within an outer vessel, E, so that a space, F, is left on every side between them. This space is filled with any solid or fluid substance or material which will serve as a good conductor of heat, in order to prevent in as great a degree as possible the freezing of the water of condensation inside the vessel A. The pipe B is carried down through the space F and through the bottom of the outer vessel.

The letters H H designate the covers of both vessels, and the letters I designate screws which fasten them.

G is a pipe which admits steam and water from an engine, or from steam-pipes or other steam apparatus which is to be cleared of the water of condensation. This pipe is carried down through the cover of the outer vessel through the space F, and thence into the inner vessel, A. The pipes G and B each have a nut, J, which follows on them, and is screwed tightly against the cover and bottom, respectively, of the vessel E, so as to make the inner vessel, A, which is connected to said pipes by screw-joints, keep in the center of the outer vessel. The water of condensation which collects in the inner vessel or trap, A, is indicated at K.

The operation is as follows: Steam and water being admitted through pipe G into the trap A, the water rises therein and raises the float C, and consequently uncovers the opening D, through which the water escapes, when the float will descend and cover the hole and prevent the escape of steam. That part of the bottom of the vessel A which is made of brass is so made to prevent the formation of rust at the place of contact between it and the float. If the whole bottom of the vessel A were made of iron and turned off true, the parts soon begin to rust, and in a short time the trap becomes useless. My improvement gets rid of this difficulty and insures the continued usefulness of the trap.

I claim as new and desire to secure by Letters Patent—

The arrangement of the trap A, containing a float, the outer vessel, E, with the pipes G and B, the said pipes being secured by following-nuts J, and pipe B, having communication with the trap through lateral opening D, substantially as and for the purpose above set forth.

JAMES NAYLOR.

Witnesses:
JOHN HANCOCK,
JAMES WILSON.